June 25, 1940. C. S. STUCKENHOLT ET AL Re. 21,496
LIGHTING DEVICE FOR GAS BURNERS
Original Filed May 7, 1937
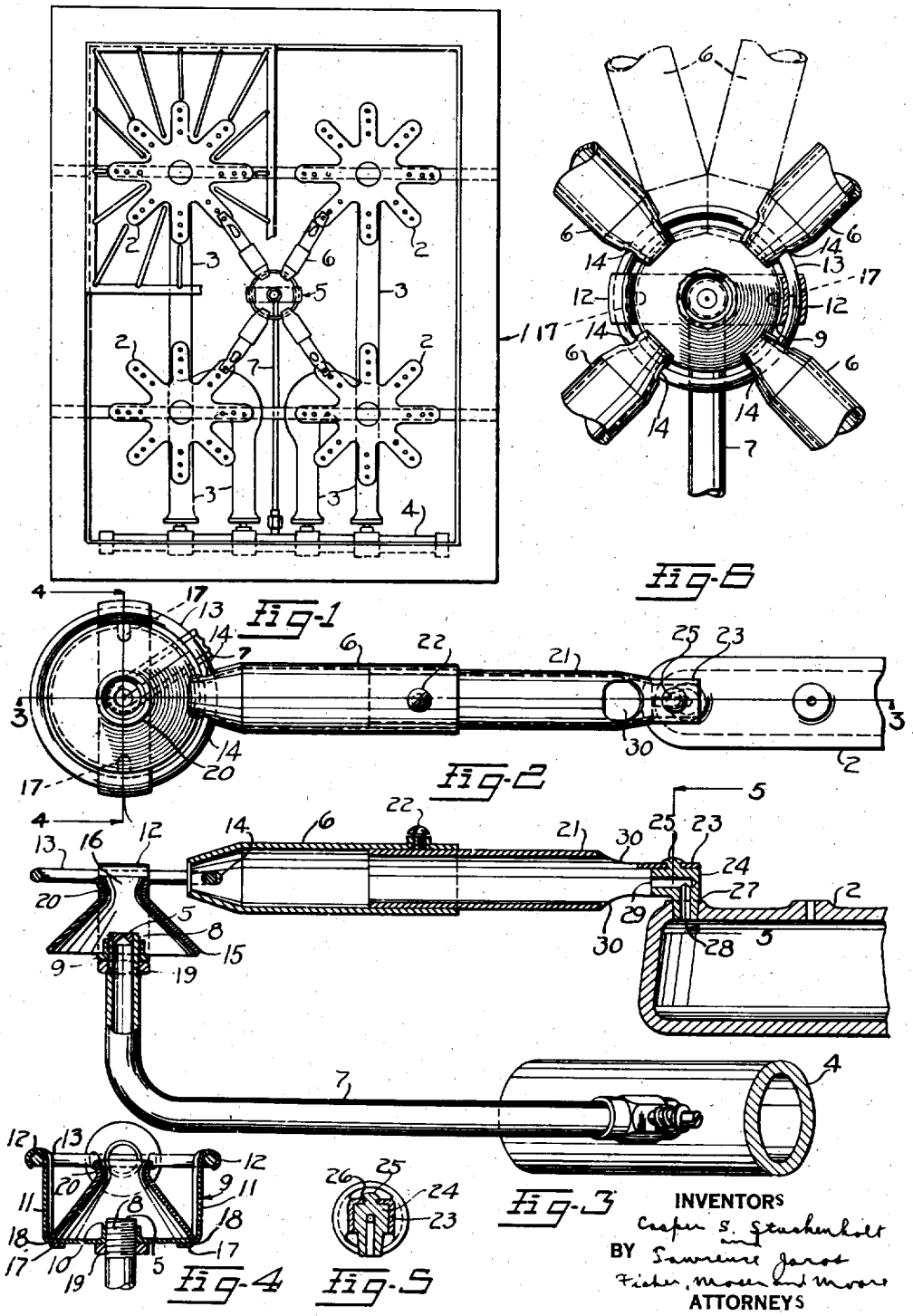
INVENTORS
Casper S. Stuckenholt
and
BY Lawrence Jarot
Fisher, Moore and Moore
ATTORNEYS Reissued June 25, 1940

Re. 21,496

UNITED STATES PATENT OFFICE 21,496

LIGHTING DEVICE FOR GAS BURNERS

Casper S. Stuckenholt and Lawrence Jaros, Cleveland, Ohio, assignors to The W. J. Schoenberger Company, Cleveland, Ohio, a corporation of Ohio Original No. 2,112,000, dated March 22, 1938, Serial No. 141,333, May 7, 1937. Application for reissue October 15, 1938, Serial No. 235,922

4 Claims. (Cl. 158—115)

Our invention relates to a lighting device for gas burners and particularly to a device for use in connection with the burners of gas stoves.

One of the objects of the invention is to provide a lighter with improved means for delivering a stream of gas from a plurality of main burners, in an unvarying direction to a fixed point in the pilot housing, regardless of the irregularities in the positioning the main burners with respect to the pilot burner or housing.

Another object of the invention is to provide a lighter with tubes of such shape that pilot ends of the tubes can be compactly placed in the pilot housing to compensate for differences in distances between the burner holes for the injection tips.

A further object of the invention is to provide a lighter with means for directing secondary air to the pilot, and for shielding the stream of air and gas passing from the tubes to the pilot from disturbing air currents.

Other objects and advantages of the invention will be apparent as the description is considered in connection with the accompanying drawing, in which:

Figure 1 is a top plan view of a conventional type of gas range, partially broken away, illustrating the application of the improved lighting device;

Figure 2 is a plan view of one of the ignition tubes;

Figure 3 is a section on the line 3—3 of Figure 1;

Figure 4 is a section through the pilot on line 4—4 of Figure 2;

Figure 5 is a sectional view on the line 5—5 of Figure 3; and

Figure 6 is an enlarged fragmentary view of the pilot showing adjustability of the tubes to side by side relationship to accommodate closely arranged burners.

Referring more particularly to the drawing wherein a preferred embodiment of the invention is illustrated, 1 designates the top frame of a stove, on which are mounted a plurality of star or other suitably shaped burners 2. Gas is supplied to the burners through mixing tubes 3 connected with a gas manifold 4. The parts just described are supported by the frame 1 in a conventional manner.

Each of the burners 2 is connected with a Bunsen type of pilot burner 5 by means of gas conveying tubes 6 in a manner presently described. A pipe 7 connected at opposite ends to the pilot burner and manifold respectively, supplies gas to the pilot burner. The upper end of the pilot burner is formed with an externally threaded portion 8 upon which is mounted a U-shaped bracket 9, the latter being formed with a threaded opening 10 for this purpose. A lock nut 19 locks the bracket against rotary movement. The vertically disposed arms 11 of the bracket 9 are curved outwardly and downwardly to provide loops 12 for supporting a split ring 13. Tubes 6, previously mentioned, one for each main burner 2, leading from the pilot to the main burners convey gas from the latter to the pilot burner where the gas becomes ignited and conveys the flame back to the burners 2 to ignite or light the same. The pilot light preferably burns constantly and the main burners are ignited by the issuance of gas therefrom and therefore without flashing the pilot. The inner ends of the tube 6 are cone shaped and these cone shaped ends are each formed with a pair of aligned openings 14 through which the split ring extends. By making the inner ends of tubes 6 conical, it is possible to suitably connect main burners, such as the two rear burners of Figure 1, with the pilot, when these burners are so close to each other as to necessitate moving the two rear tubes 6 into the substantially side by side relationship shown in dotted lines in Figure 6. This is a distinct advantage when the burner holes for the injection tips of any two burners are close together.

A substantially cone shaped hood 15 is mounted on the bracket 9 with its upper open end 16 axially aligned with the pilot burner 5. Thus, the peripheral edge of the downwardly flared wall of the hood is formed with oppositely disposed fingers 17 which extend through correspondingly disposed slots 18, formed in the base of the bracket 9. This hood directs the secondary air up to the pilot and at the same time shields the stream of air and gas mixture between the end of the tube and the pilot. An outwardly flaring collar 20 on the upper end of the hood 15 and defining the opening 16, serves to baffle the ignition gas issuing from the tubes 6. The inner cone shaped ends of the tubes 6 overlap the lower flared portion of the hood 15 and are axially aligned with the top edge of the outwardly flaring collar 20. The stream of gas is thus protected from updrafts and is directed in a more or less straight line across the open top of the hood. The collar 20 cooperates with the tapered tube and the ring 14 in baffling the ignition gas.

Tubular extensions 21 sleeved within the outer ends of tubes 6 for longitudinal adjustment relative thereto are fixed in any desired adjusted position by set screws 22. Each of the tubular extensions 21, preferably made of stampings, is formed with a reduced inverted U-shaped end 23 for the reception of a brass or steel injection tip or nipple 24, a small projection 25 on the top of the nipple being adapted to extend through an opening 26 in the top wall of the part 23. This projection is upset or spread as shown in Figures 3 and 5, to lock the nipple securely in place. The lower end of this nipple is preferably beveled to snugly but removably fit in a correspondingly shaped opening 27 formed in each burner 2 by enlarging one of the burner holes thereof. The stream of gas emerging from passage 29 entrains air through openings 30.

Whenever the burners 2 are turned on or whenever gas leaks occur, sufficient gas flows through passages 28 and 29 in nipples 24, into tubular extensions 21, and thence through tubes 6 to the pilot 5 where the gas becomes ignited and conveys the flame back to the burners.

While the inner ends of the tubes 6 are securely locked on the ring 13, the openings 14 are of sufficient size to permit of the outer ends of adjacent tubes being swung to some extent in a horizontal plane either toward or away from each other according to the relative distances apart the burners or their nipple openings are from each other. It will of course be understood that in addition to this rocking movement, the inner ends of the tubes are also free for sliding movement to any desired adjusted position before the nipples have been anchored in place. The ring 13 serves to momentarily check or slow up the flow of air and gas mixture from the tubes 6. In this way a much better mix and surer and better explosion is obtained when the mixture reaches the pilot.

Having thus described our invention, what we claim is:

1. In a lighter, the combination of a burner, a source of fuel supply therefor, a pilot, a bracket mounted for vertical adjustment on said pilot, said bracket having vertically disposed arms, a substantially cone shaped hood on said bracket and partially enveloping said pilot, a ring like member mounted in the upper ends of said arms, a tube having openings in its inner end for receiving said ring and at the other end communicating with the burner.

2. In a lighter, the combination of a burner, a source of fuel supply therefor, a pilot, a bracket on said pilot, a ring supported by said bracket and spaced from the pilot, a tube having at one end alined openings receiving said ring for slidably supporting the tube on the ring and the other end of the tube communicating with said burner.

3. In an ignition system for a gas burning appliance having a plurality of main burners, a pilot burner for igniting said burners, a source of gaseous fuel therefor, a pilot housing for said pilot having annular guide means associated therewith, flash tubes communicating at one end with said burners, the pilot ends of said tubes being provided with coupling means cooperating with said annular guide means for slidably coupling said tubes to said annular guide for movement about the axis of said housing at a point adjacent said pilot for delivering a stream of gas from the burners in an unvarying radial direction to a focal point coinciding with the vertical axis of the pilot burner, said coupling means maintaining the tubes against radial movement toward or away from the said axes and permitting the pilot ends of said tubes to be slidably adjusted toward and away from each other in an arcuate direction and in a substantially horizontal plane about the vertical axis of said pilot, while said tubes are coupled to said guide and while maintaining an unvarying directional flow of gas through said tubes with respect to said axes.

4. In a lighter the combination of a plurality of burners, a pilot, a source of fuel supply therefor, a pilot housing mounted on said pilot and provided with annular tube supporting and guide means, tubes communicating at their outer ends with said burners and at their inner ends being provided with connecting means cooperating with said annular guide means for slidably connecting said tubes to said annular guide for movement about the axis of said housing at a point adjacent said pilot for delivering a stream of gas from the said burners in an unvarying radial direction to a focal point coinciding with the vertical axis of the pilot, the said connecting means and the action of said guide means maintaining the tubes against radial movement and permitting the inner ends of said tubes to be slidably adjusted toward and away from each other in an arcuate direction and in a substantially horizontal plane about the vertical axis of said pilot, while said tubes are connected to said guide and while maintaining an unvarying directional flow of gas through said tubes with respect to said axes.

CASPER S. STUCKENHOLT.
LAWRENCE JAROS.